United States Patent
Stephenson et al.

(10) Patent No.: US 8,037,525 B2
(45) Date of Patent: Oct. 11, 2011

(54) ACCESS CONTROL AND ENTITLEMENT DETERMINATION FOR HIERARCHICALLY ORGANIZED CONTENT

(75) Inventors: John W. Stephenson, Blackstock (CA); Trevett B. Chusing, Grimsby (CA)

(73) Assignee: International Business Machines Corporation, Armonk, NY (US)

( * ) Notice: Subject to any disclaimer, the term of this patent is extended or adjusted under 35 U.S.C. 154(b) by 595 days.

(21) Appl. No.: 12/174,561

(22) Filed: Jul. 16, 2008

(65) Prior Publication Data

US 2010/0017876 A1    Jan. 21, 2010

(51) Int. Cl.
*G06F 7/04* (2006.01)

(52) U.S. Cl. .................. 726/21; 726/4; 726/17
(58) Field of Classification Search ............ 726/21, 726/4, 17
See application file for complete search history.

(56) References Cited

U.S. PATENT DOCUMENTS

| | | | | |
|---|---|---|---|---|
| 5,878,415 A * | 3/1999 | Olds | | 1/1 |
| 5,941,947 A * | 8/1999 | Brown et al. | | 709/225 |
| 6,085,191 A * | 7/2000 | Fisher et al. | | 707/737 |
| 6,154,741 A * | 11/2000 | Feldman | | 1/1 |
| 6,701,314 B1 * | 3/2004 | Conover et al. | | 707/740 |
| 6,834,301 B1 | 12/2004 | Hanchett | | |
| 7,461,158 B2 * | 12/2008 | Rider et al. | | 709/229 |
| 2003/0229623 A1 | 12/2003 | Chang et al. | | |
| 2006/0010483 A1 | 1/2006 | Buehler et al. | | |
| 2006/0190456 A1 | 8/2006 | Moses | | |

* cited by examiner

*Primary Examiner* — Kambiz Zand
*Assistant Examiner* — Abiy Getachew
(74) *Attorney, Agent, or Firm* — Steven M. Greenberg, Esq.; Carey, Rodriguez, Greenberg & Paul

(57) ABSTRACT

Embodiments of the present invention address deficiencies of the art in respect to access control and provide a method, system and computer program product for access control and entitlement determination for hierarchically organized content. In an embodiment of the invention, a method for access control and entitlement determination for hierarchically organized content can be provided. The method can include selecting a node in hierarchically organized content, inferring entitlements for direct descendants of the selected node based upon expressly conferred permissive access rights amongst ancestors and descendants of the selected node and expressly conferred impermissive rights amongst descendants of the selected node. Finally, the method can include applying the inferred entitlements in a view to the hierarchically organized content.

9 Claims, 2 Drawing Sheets

ACCESS CONTROL AND ENTITLEMENT DETERMINATION FOR HIERARCHICALLY ORGANIZED CONTENT

BACKGROUND OF THE INVENTION

1. Field of the Invention

The present invention relates to the field of access control and rights management for electronic content and more particularly to access control and entitlement determination for hierarchically organized content.

2. Description of the Related Art

Content drives the utility of a computer program. No matter the nature of the computer program, generally, a computer program accesses content, manipulates content, presents content and stores content. Much attention during the development of a computer program focuses on the efficient storage of content. With the advent of vast multi-user computing applications distributed over the global Internet, however, substantially greater attention has been placed recently on access control to content accessible by multiple different end users.

Access control refers to the restriction of access to content based upon a number of factors that may include the nature of the content sought for access, the identity of the user seeking access to the content, or the role of the user seeking access to the content. Early attempts at access control embedded the access control logic in direct connection with the program code providing access to content. Even for the most ordinary application, however, creating and maintaining a consistent access control scheme across a vast code base can be difficult and ill advised. As such, at present, it is preferred to define an entire data structure for permitting or restricting access to different content in a multi-user computing application, such that every attempt to access content in a computing application can refer to a central access control list (ACL) in order to determine whether or not to grant the specified type of access to particular content in the computing application.

The management of access control, in of itself, can be computer resource intensive process. In this regard, while a certain degree of resource consumption is expected during the execution of the core logic of a computing application, the additional overlay of access control can provide a further degree of resource consumption. So long as the degree of resource consumption does not compare to that of the computing application itself, the benefit of access control can outweigh its costs. However, where resource consumption for access control becomes noticeable in the operation of a corresponding computing application, one must consider whether access control is feasible.

Notably, resource consumption due to access control can be quite noticeable when applying access control to hierarchically organized content. Generally referred to as a "tree", a hierarchically organized set of content can include a selection of nodes arranged hierarchically from a single root to many different leaves leaf via branches and sub-trees as it is well known in the art. When addressing access control for hierarchically organized content, the core concern is the determination of access rights for an authenticated user one node based upon access rights afforded to the authenticated user in connection with a parent node.

Traditionally, developers have approached the problem of access control for hierarchically organized content either by storing all implied access control information for each node in connection with the node in the data structure supporting the hierarchically organized content. Specifically, instead of populating an ACL table with only entries explicitly granted at nodes within a tree, the implication of a new access grant can be determined for what the access grant implies at descendant nodes. The amalgamation of the determined access grant and its implications can be placed as an entry in the ACL table. To do so, however, can require the storage of substantial data in the ACL table as the ACL would store all explicit and implicit rights for every user and group for all access to the tree. Maintaining the accuracy of the access information then becomes difficult as inevitable changes in access control rights occur. Some of these changes may result in many changes to the ACL table within the data store.

As another approach, developers programmatically iterate through all child nodes of a selected node in order to perform an access control check for the selected node. This approach involves using the base tree information to retrieve all children of the node and then, for each child, performing an access control check using the information in the ACL table. This algorithm uses much of the same logic to determine what access a user has on a child node, but introduces a new multiple into the performance equation—namely the number of children. Thus, for large trees, the number of children can be very large, and performance degrades linearly as the number of children increases.

BRIEF SUMMARY OF THE INVENTION

Embodiments of the present invention address deficiencies of the art in respect to access control and provide a novel and non-obvious method, system and computer program product for access control and entitlement determination for hierarchically organized content. In an embodiment of the invention, a method for access control and entitlement determination for hierarchically organized content can be provided. The method can include selecting a node in hierarchically organized content, inferring entitlements for direct descendants of the selected node based upon expressly conferred permissive access rights amongst ancestors and descendants of the selected node and expressly conferred impermissive rights amongst descendants of the selected node. Finally, the method can include applying the inferred entitlements in a view to the hierarchically organized content.

In an aspect of the embodiment, inferring entitlements for direct descendants of the selected node based upon expressly conferred permissive access rights amongst ancestors and descendants of the selected node and expressly conferred impermissive rights amongst descendants of the selected node can include populating an entitlement list with direct descendant nodes exclusive of nodes to which impermissive access control rights have been expressly applied when at least one ancestor node has had permissive access control rights expressly applied. However, when at least one ancestor node has not had permissive access control rights expressly applied, the entitlement list can be populated with direct descendant nodes for which downstream descendent nodes have had permissive access control rights expressly applied.

In another embodiment of the invention, a data processing system can be configured for access control and entitlement determination for hierarchically organized content. The system can include a multi-user application managing hierarchically organized content of multiple different hierarchically arranged nodes and generating a view to the nodes of the hierarchically organized content. The system also can include a data store of access control rights specified for selected ones of the nodes. In particular, the access control rights can include both permissive access control rights and impermissive access control rights. Finally, access control and entitlement determination logic can be coupled to the multi-user application The logic can include program code enabled to inferring entitlements for direct descendants of a selected node in the view to the nodes based upon expressly conferred permissive access rights amongst ancestors and descendants of the selected node and expressly conferred impermissive rights amongst descendants of the selected node. Optionally, the data store of access control rights can be a table including records. Each record can specify one of a user, group and role, a reference to a node in the hierarchically organized content, a path to navigate to the referenced node and at least a permissive or impermissive access control right.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for access control and entitlement determination for hierarchically organized content. In accordance with an embodiment of the present invention, for a selected node in hierarchically organized content, access rights can be determined for all ancestors to the selected node. Subsequently, if implicit rights had been granted on any of the ancestor nodes, implicit rights can be presumed for the descendants of the selected node with the exception of descendants with an explicit denial of access. Otherwise, the explicit rights can be determined for the descendants of the selected node in that the rights that have been explicitly granted for the descendants can be identified and a list of only the immediately descendants each acting as a root to a sub-tree containing the identified descendants can be returned as entitled descendants.

Thus, for very large trees to which access control and entitlement must be applied, the process of access control and entitlement determination described herein will be more scalable, and will be performed in a less linear fashion than the known art. Specifically, the approach of the present invention does not degrade with the amount of content within the tree as a whole, but only with the depth of the tree. Consequently, incremental expansion of the tree can be permitted with no performance impact associated with the presence of many children in the tree.

Figure 1:
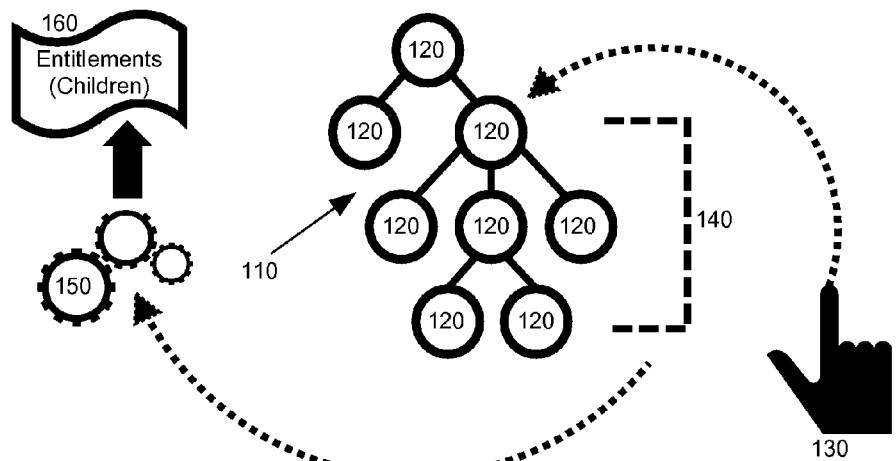
FIG. 1 is a pictorial illustration of a process for access control and entitlement determination for hierarchically organized content.

In illustration, FIG. 1 is a pictorial illustration of a process for access control and entitlement determination for hierarchically organized content. As shown in FIG. 1, hierarchically organized content 110 can be provided to include multiple different nodes 120 arranged in a hierarchy of a root one of the nodes followed by descendant ones of the nodes 120 and terminating in leaf ones of the nodes 120. In this regard, aside from the root one of the nodes 120, each other one of the nodes 120 can have one or more ancestors, or one or more descendants, or both. An exemplary form of the hierarchically organized content 110, then can include a tree as is commonly used to represent hierarchically organized in a file system, a project management system, a registry, and the like.

In accordance with an embodiment of the invention, a selection 130 amongst the nodes 120 can trigger a process for access control and entitlement determination 150 to determine entitlements 160 for descendant ones of the nodes 120 for the selection 130. Specifically, permissive access apparent for ancestors of the selection 130 can be inferred upon the descendant ones of the nodes 120 for the selection 130 with the exception of impermissive rights (access deny) explicitly applied to individual ones of the descendant ones of the nodes 120. To the extent that no permissive access is apparent from the ancestors of the selection 130, then permissive access will be inferred upon only those immediate descendants of the selection 130 below which one or more other descendants have been granted permissive access.

In this way, access control and entitlement data need not be stored and processed inefficiently in direct connection with every one of the nodes 120 of the hierarchically organized content 110. Further, a tree view of the hierarchically organized content 110 can be rendered and access to content underlying different nodes 120 descending from a selection 130 can be permitted only as permitted by the inferred entitlements.

Figure 2:
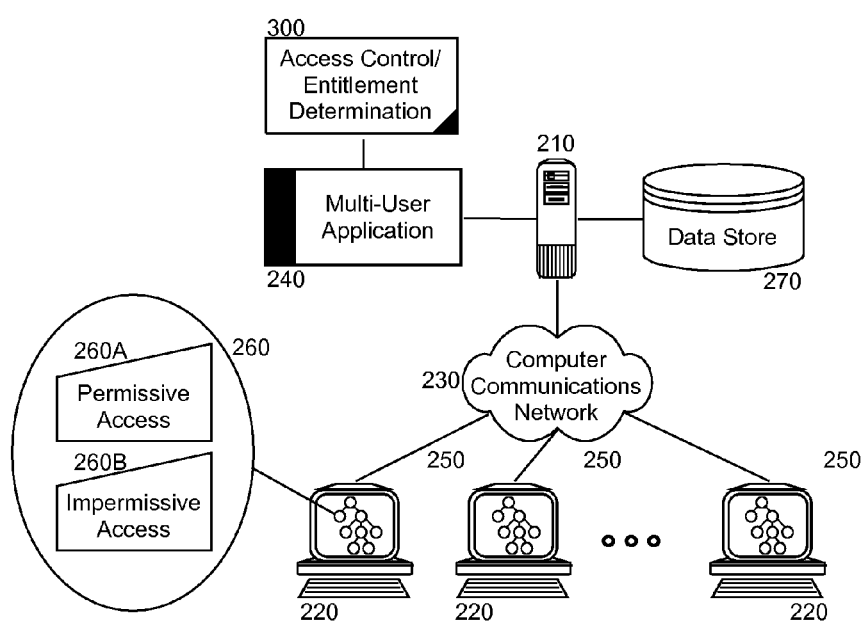
FIG. 2 is a schematic illustration of a data processing system configured for access control and entitlement determination for hierarchically organized content.

In further illustration, FIG. 2 is a schematic illustration of a data processing system configured for access control and entitlement determination for hierarchically organized content. The system can include a host computing platform 210 hosting the execution of a multi-user application 240 accessible by multiple different users over computer communications network 230 through clients 220. A hierarchy view 250 to hierarchically organized content stored in data store 270 can be provided by the multi-user application 240 for viewing in each of the clients 220. Of note, access control data 260 including permissive access rights 260A such as "read" or "comment" or "edit" or "modify" or "delete", as well as impermissive access rights 260B, such as "deny", can be associated with selected nodes of the hierarchically organized content and stored in data store 270.

Access control and entitlement determination logic 300 further can be coupled to the multi-user application 240. The access control and entitlement determination logic 300 can include program code enabled to respond to a selection of a node in the hierarchy view 250 by determining whether or not permissive access rights 260A have been expressly granted to any ancestor of the selected node. If so, the permissive access rights 260A expressly granted to the ancestor or ancestors can be inferred upon all descendants of the selection excepting for descendants for whom impermissive access rights 260B have been expressly set forth. Otherwise, permissive access rights 260A can be inferred for all direct descendants of the selection for whom downstream descendents have had permissive access rights 260A expressly applied thereto.

Figures 3, 4:
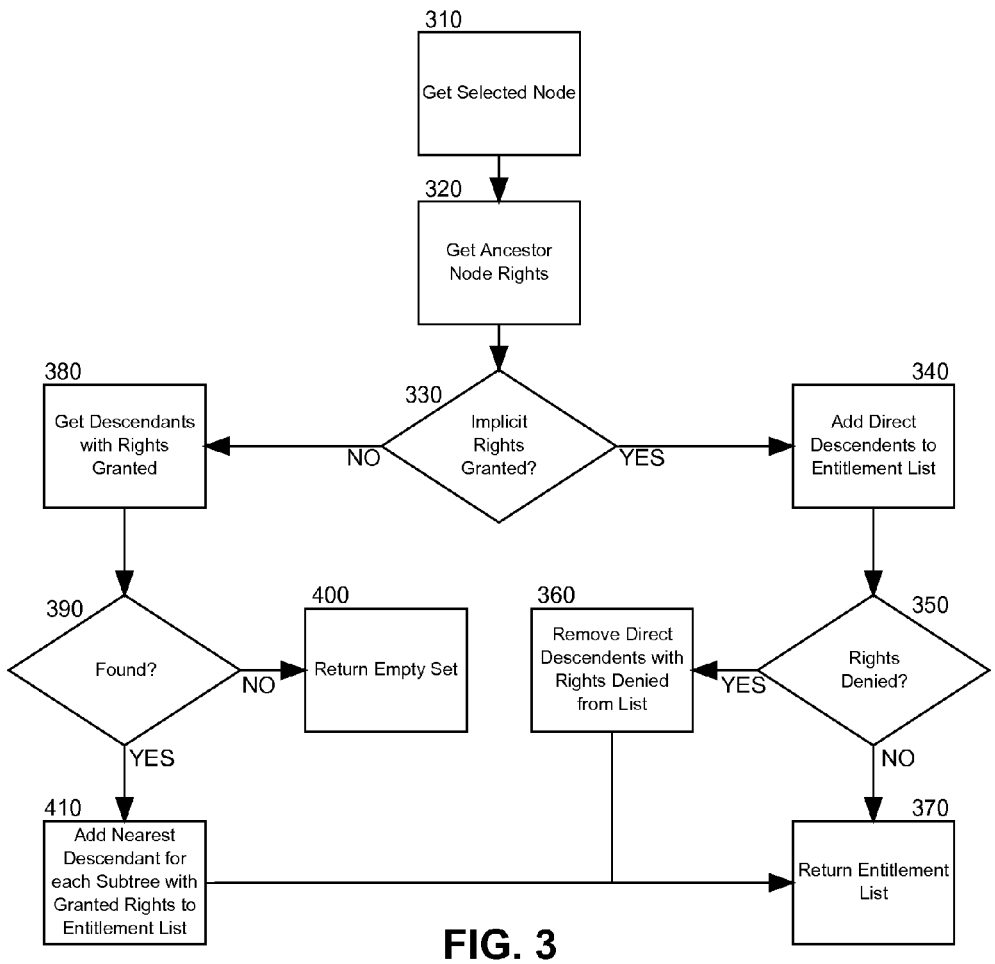
FIG. 3 is a flow chart illustrating a process for access control and entitlement determination for hierarchically organized content; and, FIG. 4 is a pictorial illustration of a table structure defining hierarchically organized content configured for access control and entitlement determination.

In yet further illustration, FIG. 3 is a flow chart illustrating a process for access control for hierarchically organized content. Beginning in block 310, a node can be selected through a view to hierarchically organized content. In block 320, the access control rights for the ancestors of the selected node can be determined, if any. In decision block 330, if permissive access control rights have been applied to any of the ancestors of the selected node, then in block 340, the descendants of the selected node can be added to an entitlement list. In decision block 350, it further can be determined whether or not impermissive access rights have been applied to any of the descendants in the entitlement list. If so, in block 360 those descendants with impermissive access rights can be removed from the entitlement list and the entitlement list can be returned 370.

In decision block 330, if permissive access control rights have not been applied to any of the ancestors of the selected node, then in block 380 those descendants of the selected node can be identified that have permissive access rights granted. In decision block 390, if descendants of the selected node cannot be identified that have permissive access rights granted, then an empty set can be returned in block 400. However, in decision block 390 if descendants of the selected node can be identified that have permissive access rights granted, in block 410 the immediate descendant to the selected node having an identified descendant with permissive access rights granted can be added to the entitlement list. Finally, in block 370 the entitlement list can be returned.

The process shown in FIG. 3 can be facilitated through a table structure of defining the hierarchically organized content, and a separate table structure defining access control rights in respect to the nodes of the hierarchically organized content. Specifically, FIG. 4 is a pictorial illustration of a table structure defining hierarchically organized content configured for access control and entitlement determination. As shown in FIG. 4, hierarchy table 450 can include different records, each specifying a node by ID, name, description and a reference to the immediate ancestor of the node, if any. In this way, a parsing of the hierarchy table 450 can result in a reconstruction of the hierarchically organized content.

A separate access control rights table 460 can be provided. The access control rights table 460 can include a user, group or role specified in each record along with a reference to a node in the hierarchically organized content of the hierarchy table 450. Further, each record can specify a path to arrive at the node in the hierarchically organized content of the hierarchy table 450. Finally, a specification of access control rights can be provided in each record. Importantly, no records need be provided for nodes in the hierarchically organized content for which no access control rights have been expressly set forth. Yet, the entitlement of a user to access those nodes with no records can be inferred by reference to the hierarchy table 450 and the access control rights table 460 through the use of the process for access control and entitlement determination described herein.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for access control and entitlement determination for hierarchically organized content comprising:
    selecting a node in hierarchically organized content;
    inferring entitlements for direct descendants of the selected node based upon expressly conferred permissive access rights amongst ancestors and descendants of the selected node and expressly conferred impermissive rights amongst descendants of the selected node; and,
    applying the inferred entitlements in a view to the hierarchically organized content;
    wherein the inferring comprises:
    populating an entitlement list with direct descendant nodes exclusive of nodes to which impermissive access control rights have been expressly applied when at least one ancestor node has had permissive access control rights expressly applied; and,
    otherwise populating an entitlement list with direct descendant nodes for which downstream descendent nodes have had permissive access control rights expressly applied.

2. The method of claim 1, wherein applying the inferred entitlements in a view to the hierarchically organized content, comprises rendering a tree view of the hierarchically organized content and permitting access to content underlying different nodes descending from the selected node through a selection of a node representative of the content in the tree view only as permitted by the inferred entitlements.

3. A data processing system configured for access control and entitlement determination for hierarchically organized content, the system comprising:

a multi-user application executing in memory by at least one processor of a computer and managing hierarchically organized content of multiple different hierarchically arranged nodes and generating a view to the nodes of the hierarchically organized content;

a data store of access control rights specified for selected ones of the nodes, the access control rights comprising both permissive access control rights and impermissive access control rights; and, access control and entitlement determination logic coupled to the multi-user application, the logic comprising program code enabled to infer entitlements for direct descendants of a selected node in the view to the nodes based upon expressly conferred permissive access rights amongst ancestors and descendants of the selected node and expressly conferred impermissive rights amongst descendants of the selected node;

wherein the entitlements for direct descendants of the selected node are inferred by:

populating an entitlement list with direct descendant nodes exclusive of nodes to which impermissive access control rights have been expressly applied when at least one ancestor node has had permissive access control rights expressly applied; and, otherwise populating an entitlement list with direct descendant nodes for which downstream descendent nodes have had permissive access control rights expressly applied.

4. The system of claim 3, wherein the permissive rights comprise read and comment rights.

5. The system of claim 3, wherein the impermissive rights comprise deny access rights.

6. The system of claim 3, wherein the data store of access control rights is a table comprising records, each record specifying one of a user, group and role, a reference to a node in the hierarchically organized content, a path to navigate to the referenced node and at least a permissive or impermissive access control right.

7. The system of claim 3, wherein the view to the nodes of the hierarchically organized content is a tree.

8. A computer program product comprising a computer usable storage medium storing computer usable program code for access control and entitlement determination for hierarchically organized content, the computer program product comprising:

computer usable program code for selecting a node in hierarchically organized content;

computer usable program code for inferring entitlements for direct descendants of the selected node based upon expressly conferred permissive access rights amongst ancestors and descendants of the selected node and expressly conferred impermissive rights amongst descendants of the selected node; and, computer usable program code for applying the inferred entitlements in a view to the hierarchically organized content;

wherein the computer usable program code for inferring comprises:

computer usable program code for populating an entitlement list with direct descendant nodes exclusive of nodes to which impermissive access control rights have been expressly applied when at least one ancestor node has had permissive access control rights expressly applied; and, computer usable program code for otherwise populating an entitlement list with direct descendant nodes for which downstream descendent nodes have had permissive access control rights expressly applied.

9. The computer program product of claim 8, wherein the computer usable program code for applying the inferred entitlements in a view to the hierarchically organized content, comprises computer usable program code for rendering a tree view of the hierarchically organized content and permitting access to content underlying different nodes descending from the selected node through a selection of a node representative of the content in the tree view only as permitted by the inferred entitlements.

* * * * *